United States Patent [19]

Ballarini

[11] Patent Number: 4,466,683

[45] Date of Patent: Aug. 21, 1984

[54] MODULAR STRIP FUSE CARRIER ASSEMBLY

[75] Inventor: Ottavio Ballarini, Turin, Italy

[73] Assignee: Fiat Auto S.p.A., Turin, Italy

[21] Appl. No.: 396,502

[22] Filed: Jul. 8, 1982

[30] Foreign Application Priority Data

Mar. 17, 1982 [IT] Italy .............................. 67338 A/82

[51] Int. Cl.[3] ............................................. H02B 1/04

[52] U.S. Cl. ............................. 339/125 R; 339/198 H

[58] Field of Search .......... 339/147 R, 198 G, 198 H, 339/134, 125 R

[56] References Cited

U.S. PATENT DOCUMENTS 3,993,395 11/1976 Taylor ............................ 339/198 H 4,171,802 10/1979 Krasser ............................ 339/198 H 4,180,305 12/1979 Ustin et al. ..................... 339/198 H 4,238,140 12/1980 Cairns et al. .................... 339/134 X

*Primary Examiner*—Eugene F. Desmond

*Attorney, Agent, or Firm*—Sughrue, Mion, Zinn, Macpeak and Seas

[57] ABSTRACT

A modular strip fuse carrier assembly for motor vehicles comprises one or more identical component blocks which have respective attachment means on their opposite faces so that they can be engaged with each other or with support members fixable to the vehicle bodywork. The engagement between the blocks or between the blocks and the support members is maintained by respective resiliently interengageable locking means. The support members may comprise two brackets or a connector of a remote control switch carrier.

3 Claims, 2 Drawing Figures

MODULAR STRIP FUSE CARRIER ASSEMBLY

The present invention relates to strip fuse carriers for motor vehicles.

At present, when certain types of motor vehicles have to be fitted with additional optional or supplementary functions, it is necessary to add fuse carrier boxes for which the vehicle has a number of attachment points. Since these fuse carrier boxes are standard, that is, of the same size, it frequently happens that there are more positions available for the fuses than are necessary for protecting the circuits of the equipment which is to be provided. As an alternative to this, a supplier may make special fuse carrier boxes suitable for a particular type of motor vehicle.

Clearly, both of these solutions involve the costs of making the various types of fuse carrier boxes, and increase the production costs of the motor vehicle itself.

The object of the present invention is to provide a strip fuse carrier of simple manufacture and low production costs, which allows the inclusion of one or more fuse carriers according to the needs of the motor vehicle being provided with additional optional equipment, without having to make special fuse carriers or special positions on the motor vehicle.

The present invention achieves these objects by means of a strip fuse carrier assembly for motor vehicles, comprising one or more identical, modular, fuse-carrying components each of which has two opposing faces with respective attachment means, the attachment means on one face of one said component being engageable either with the attachment means on the opposite face of another said component or with cooperating attachment means on at least one support member fixable to the vehicle bodywork, and resiliently interengageable locking means on the faces of each component and on each support member respectively, for maintaining the components in their positions of engagement.

Figure 2:
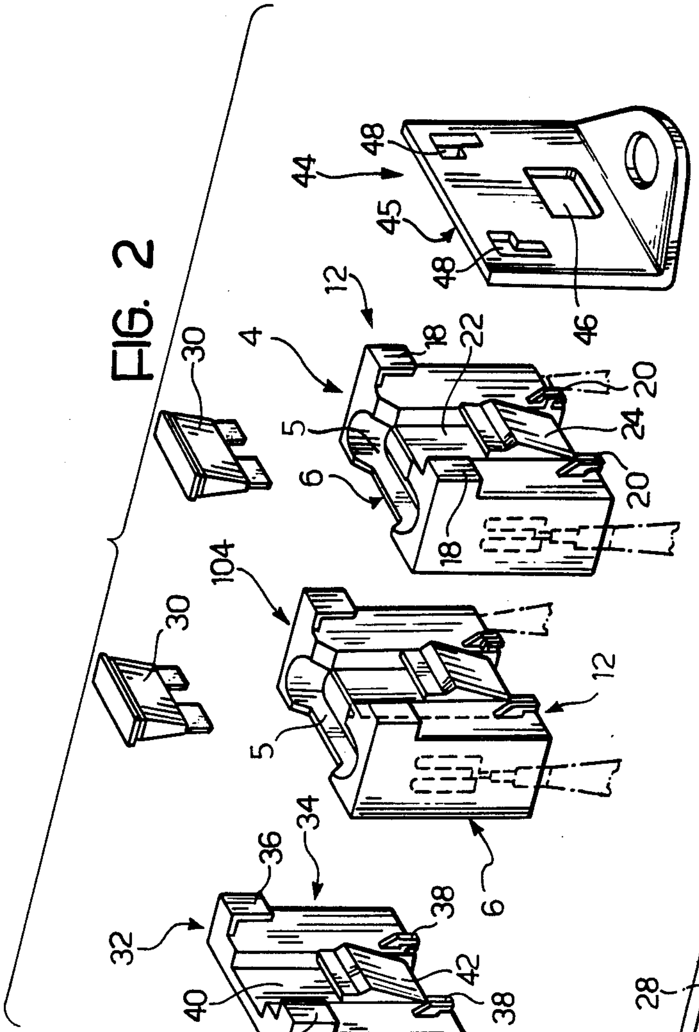
Figure 1:
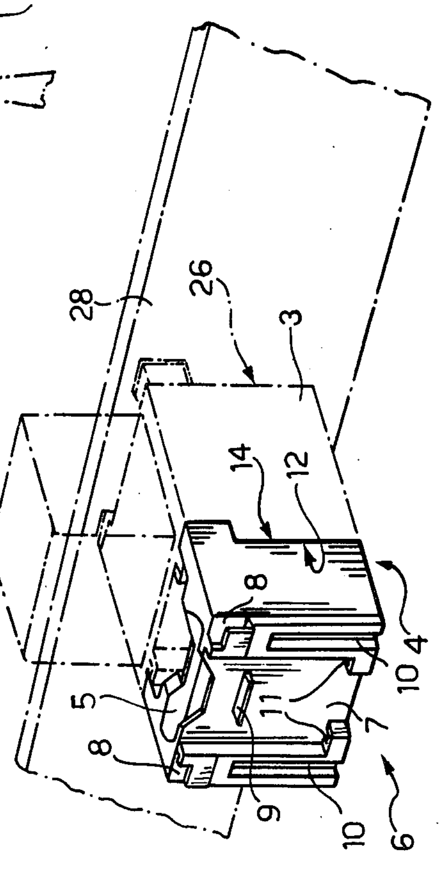

One embodiment of the invention will now be described, by way of example, with reference to the appended drawings, in which:

FIG. 1 is a perspective view of a strip fuse carrier assembly according to the present invention in a first mode of installation in a motor vehicle, and FIG. 2 is a perspective view of the system of FIG. 1 in a second mode of installation in the vehicle.

FIG. 1 of the drawings shows, in broken outline, a connector 3 of a remote-control switch carrier, with which is engaged a component block 4 of a strip fuse carrier assembly. The upper part of the block 4 defines a socket 5 for the insertion of a strip fuse 30 (FIG. 2,) and a first frontal face 6 of the block 4 is moulded with a flat 7, two rectangular seats 8, a tab 9, two slots 10, and two sockets 11. The opposite or second frontal face 12 of the block 4, as shown in FIG. 2, is formed with two L-shaped projections 18, two hooks 20, and a recess 22 a lower part of which is formed with a resilient tongue 24.

The outer face 14 of the connector 3 has the same dimensions and structural features as the first face 6 of the block 4, and is in facial contact with the second face 12 thereof. The inner face 26 of the connector 3 is in facial contact with the vehicle bodywork 28 and has the same dimensions and structural features as the second face 12 of the block 4.

In addition to being provided with the upper socket 5 for the strip fuse 30, the block 4 may also be adapted for the insertion of a thermal switch (not shown) if it is appropriate to use the latter in the equipment being fitted to the vehicle.

An L-shaped bracket 32 (FIG. 2) may be fixed to the bodywork 28 in place of the connector 3. The outer face 34 of the bracket is formed with two projections 36, two hooks 38, and a recess 40 having a resilient tongue 42 in its lower part. These features have the same shapes and sizes as those on the second face 12 of the block 4. A second L-shaped bracket 44 is also fixable to the bodywork, and its wall 45 has a rectangular hole 46 and two L-shaped apertures 48.

In a first mode of installation, the connector 3 of the switch carrier acts as the means of support for the fuse carrier assembly. The connector 3 is fixed to the bodywork 28 so that its inner face 26 is in contact therewith by the insertion of its L-shaped projections, hooks, and resilient tongue, in suitable seats formed in the bodywork 28.

The face 12 of the block 4 bears against the face 14 of the connector 3 and is engaged, so as to fix the block to the connector, by the insertion of the L-shaped projections 18 and the hooks 20 into the rectangular seats and the sockets, and the snap-engagement of the resilient tongue over the tab, on the outer face 14 of the connector 3 corresponding to the first face 6 of the block 4. The engagement of the L-shaped projections within the rectangular seats and of the hooks within the sockets, is maintained by the pressure which the resilient tongue exerts against the tab after its snap-engagement therewith. A second block of the same shape and size may be engaged securely on the block 4 in the same way.

Thus, by engagement with the connector 3 which acts as the support for the fuse carrier assembly, one or more modular blocks 4, as necessary for the additional optional or supplementary functions required for the motor vehicle, may be connected without having to make special fuse carrier boxes or special positions on the vehicle itself.

In a second mode of installation, for circuits in which a remote-control switch is not necessary, perforated positions on the bodywork 28 suitable for receiving the brackets 32, 44 and any boxing for the component blocks 4 are used. The bracket 44 is bolted to the bodywork 28 with its lower part bearing against the bodywork, and the second face 12 of the block 4 bears frontally against the wall 45 of the bracket so that the block 4 is securely mounted on the bracket 44 by the insertion of the L-shaped projections 18 in the apertures 48 and the partial engagement of the resilient tongue 24 in the hole 46. The engagement of the projections 18 in the apertures 48 is maintained by the pressure which the resilient tongue 24 exerts against the wall 45 of the bracket 44.

A second block 104 of the same shape and size may be coupled securely to the block 4 by engaging the two L-shaped projections 18 and hooks 20 on this second block 104 with the seats and sockets on the first face 6 of the block 4. In this case also, the fixing of the L-shaped projections 18 within the seats and the fixing of the hooks 20 within the sockets is maintained by the pressure which the resilient tongue 24 exerts against the tab after its snap-engagement therewith.

Subsequent blocks of the same shape and size may be connected to the first two in a similar manner to that described above. The last of these blocks is engaged with the bracket 32 which is fixed to the bodywork in a similar manner to the bracket 44 and is provided to retain the assembled pack of modular fuse-carrying blocks. The last block is attached to the bracket 32 by the engagement of the projections 36, the hooks 38, and the resilient tongue 42 of the bracket 32 with the seats, the sockets and the tab on the first face of this last block, securing the latter and hence the whole pack of blocks to the bracket 32. In this case also, the engagement is maintained by the pressure which the resilient tongue 42 exerts on the tab of the block after its snap-engagement therewith.

Thus, even in the absence of a remote-control switch carrier to act as a support, with the modular fuse carrier assembly of the present invention, the fitting of one or more additional optional supplementary functions on the motor vehicle may be effected by connecting one or more fuse carrying blocks as necessary, without having to make special fuse carrier boxes or special arrangements on the vehicle itself.

I claim:

1. A strip fuse carrier assembly for motor vehciles, comprising:

a plurality of identical, modular, fuse-carrying components with two opposite faces;

at least one support member fixable to the vehicle bodywork;

respective attachment means on said opposite faces of the components and on said support member, whereby the attachment means on one said face of one component is engageable with the attachment means on the opposite said face of another component or with the attachment means on said support member, and resiliently interengageable locking means on said faces of each component and on each support member respectively, for maintaining the components in their positions of engagement, wherein:

each fuse-carrying component comprises a block with a socket for a respective strip fuse;

the attachment means on said one face of the block comprise rectangular seats and sockets, and the attachment means on said opposite face of the block comprise L-shaped projections and hooks, and the interengageable locking means comprise respectively a flat and a tab on said one face and a resilient tongue on said opposite face.

2. A strip fuse carrier assembly as defined in claim 1, wherein the support member comprises a connector of a remote-control switch carrier, and wherein the attachment means and locking means of said connector correspond respectively to said attachment means and locking means on said one face of the block, so as to be engageable with the respective said means on said opposite face of the block.

3. A strip fuse carrier assembly as defined in claim 1, wherein the support members comprise two brackets, the attachment means and locking means of one said bracket corresponding to those on said opposite face of the block so as to be engageable with the respective said means on said one face of the block, and wherein the other said bracket has apertures and a rectangular hole engageable and partially-engageable respectively by the L-shaped projections and resilient tongue on said opposite face of the block.

* * * * *